United States Patent [19]

Green et al.

[11] Patent Number: 4,891,065
[45] Date of Patent: Jan. 2, 1990

[54] PROCESS FOR PRODUCING HIGH PURITY MAGNESIUM

[75] Inventors: William G. Green, Freeport; James E. Hillis, Angleton, both of Tex.

[73] Assignee: The Dow Chemical Company, Midland, Mich.

[21] Appl. No.: 237,928

[22] Filed: Aug. 29, 1988

[51] Int. Cl.$^4$ ............................................. C22B 26/22
[52] U.S. Cl. ....................................... 75/63; 75/67 A
[58] Field of Search ......................... 75/67 A, 67 R, 63

[56] References Cited

U.S. PATENT DOCUMENTS

| | | | |
|---|---|---|---|
| 2,029,898 | 2/1936 | Schmidt et al. | 75/63 |
| 2,373,515 | 4/1945 | Stroup et al. | 75/67 A |
| 2,373,516 | 4/1945 | Stroup et al. | 75/67 A |
| 2,384,835 | 9/1945 | Hanawalt et al. | 75/67 A |
| 4,417,920 | 11/1983 | Mena et al. | 75/63 |
| 4,695,320 | 9/1987 | Christini et al. | 75/67 A |

FOREIGN PATENT DOCUMENTS

| | | |
|---|---|---|
| 416493 | 3/1974 | U.S.S.R. |
| 665007 | 5/1979 | U.S.S.R. ............................... 75/67 R |
| 591225 | 8/1987 | United Kingdom . |

OTHER PUBLICATIONS

Lundin et al The System Zirconium-Silicon, *Am Soc Metals* Preprint pp. 1-3, Sep. 1952.
E. F. Emley, "Principals of Magnesium Technology", Pergamon Press, New York, 1966, pp. 178 and 184–185.
A. Schneider and J. Stendel, "Precipitation of Intermetallic Phases from Molten Metal", Z. F. Anorg. Allg. Chemie, 303, 1960, pp. 227–246.

*Primary Examiner*—Melvyn J. Andrews

[57] ABSTRACT

A process for producing magnesium low in iron contamination including contacting a magnesium melt with a combination of a zirconium material and a silicon material to reduce the iron contamination without introducing detrimetal levels of reagent elements in the product magnesium.

34 Claims, 3 Drawing Sheets

PROCESS FOR PRODUCING HIGH PURITY MAGNESIUM

BACKGROUND OF THE INVENTION

This invention relates to a process for producing pure magnesium and, more particularly, to a process of removing iron impurities from magnesium by treating a magnesium melt with a combination of materials to remove iron impurities from the magnesium melt without simultaneously introducing detrimental levels of the materials or elements used.

Recently, there has been an increased demand by magnesium users for a "high purity" magnesium, i.e., a magnesium containing zero to minute concentrations of metallic impurities, for example, wherein each and every specific impurity present in the magnesium, such as iron, is present in concentrations of less than 100 ppm. Typically, magnesium produced by electrolysis in electrolytic cells contains from 300 ppm to 450 ppm iron as an impurity. Generally, iron is an unwanted impurity by users of magnesium in pharmaceutical, metal reduction, nuclear, and high performance alloy applications. While an iron-free magnesium is ideal, typically, a magnesium containing less than 70 ppm of iron is required for such applications.

There are various known processes for the removal of iron contamination from magnesium in which a variety of reagents are utilized.

For example, manganese chloride ($MnCl_2$) is a common, relatively effective, and economical reagent when used in the production of magnesium alloys containing aluminum, but when the $MnCl_2$ reagent is used in a process for producing pure (unalloyed) magnesium, a manganese solubility of about 1-2% at common production operating temperatures (650° C.-750° C.) is observed. This manganese solubility is too great for high purity magnesium production and, generally, iron cannot be effectively reduced to less than 200 ppm from a magnesium melt containing in excess of 1% manganese.

Another reagent used in removing iron impurities from magnesium is beryllium chloride ($BeCl_2$) which is an effective reagent with relatively low residual levels of Be in the magnesium product, but $BeCl_2$ is not a desirable choice of reagents because of beryllium's toxicity.

Titanium tetrachloride ($TiCl_4$) is another reagent which is relatively effective as a reagent for reducing iron in magnesium. To produce magnesium with iron contents of less than 70 ppm, the residual Ti in the product magnesium typically runs about 100 ppm or more. The $TiCl_4$ reagent also suffers from the fact that a significant investment would be required to safely meter and control this volatile, acrid smoke producing liquid in a foundry environment and still meet rigid air pollution control levels.

Zirconium tetrachloride ($ZrCl_4$) and Zr are known to be effective for iron, manganese, aluminum, nickel, cobalt, antimony, silicon and/or tin reduction and are used in rare earth alloys to control iron contamination and to produce desirable fine grain structures by acting as a nucleating agent for metal crystallization. In magnesium, the solubility of Zr is on the order of 0.5-0.7% at normal foundry operating temperatures (i.e. from about 650° C. to 750° C.). The use of zirconium alone for iron reduction, however, results in zirconium levels which typically run 400 ppm to 700 ppm or more in the product magnesium when the iron level is reduced to less than 70 ppm. The zirconium level in this process exceeds an acceptable maximum level for a high purity magnesium, i.e., a magnesium which generally requires that all individual contaminants in the magnesium be less than 100 ppm (0.010%).

Elemental boron (B) and boron trichloride ($BCl_3$) have been found to be relatively effective reagents for iron reduction in magnesium. However, $BCl_3$ like $TiCl_4$ is a volatile liquid which has a melting point of about minus 107° C. and a boiling point of about 125° C. and which readily hydrolyzes in moist air to form an acrid smoke consisting of $HCl + H_3BO_3$ or $B_2O_3 \cdot xH_2O$. Consequently, $BCl_3$, like $TiCl_4$, requires costly metering and containment controls. The use of the above $BCl_3$ process produces a product containing less than 0.003% Fe and less than 0.003% B, but is relatively expensive. U.S. Pat. No. 4,417,920 issued Nov. 29, 1983 discloses the use of $BCl_3$ and halogenated derivatives of boron for iron removal in magnesium.

The use of a boron oxide/flux reagent as a reagent for removing iron from magnesium is also known. The treatment of magnesium with a boron oxide/flux reagent has the advantages of low cost, minimal environmental impact, and leaves very little residual reagent in the magnesium product.

The problem with the use of boron-containing reagents, such as the aforementioned, is that a residual boron is present in the final magnesium product. Boron is highly objectionable in nuclear applications because of its high cross-section for neutron absorption and the magnesium used in such applications, or related applications, is therefore, required to contain less than about 1 ppm to as low as about 0.5 ppm boron.

It is desired to provide a process for removing iron from magnesium which is simple and relatively cost effective.

It is further desired to provide a treatment process for removing iron from magnesium using boron-free reagent elements and which do not result in a magnesium product with more than 100 ppm of the reagent element. The resultant magnesium product metal produced by the process of the present invention may be advantageously used in applications directly or indirectly involved with the nuclear industry.

SUMMARY OF THE INVENTION

The present invention is directed to a process for producing magnesium low in metallic contaminants comprising treating a magnesium melt with a combination of a zirconium material and a silicon material to reduce iron contamination without introducing detrimental levels of reagent elements in the product magnesium.

DETAILED DESCRIPTION OF THE PREFERRED EMBODIMENTS(S)

Figure 1:
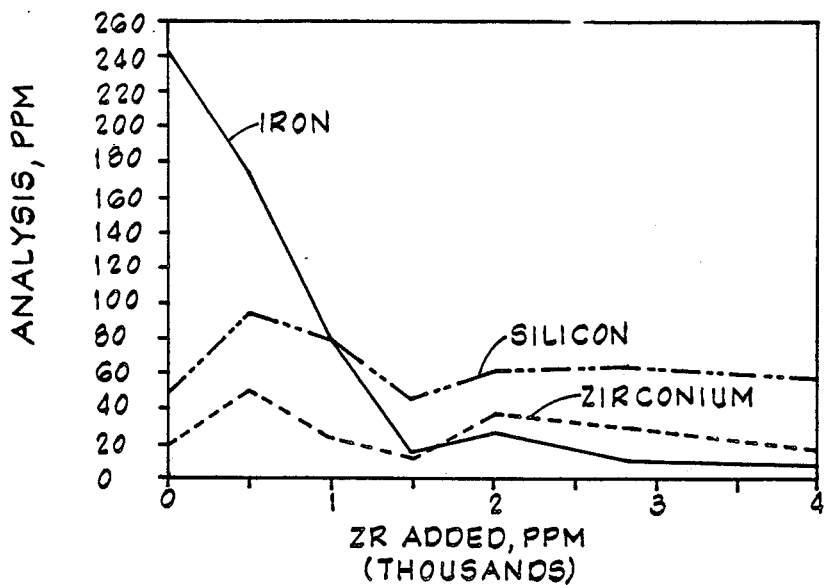
FIG. 1 is a graphical illustration of the content of iron, zirconium and silicon in magnesium melt when sequentially treated with increasing amounts of a 4:1 ratio of Zr/Si reagent.

The present invention is directed to a process by which iron contamination in molten magnesium can be substantially reduced without introducing detrimental levels of other elements or impurities. The process includes contacting the molten magnesium with a combination of a zirconium material and a silicon material. The order of the addition of the zirconium and silicon to the melt is not critical. It is preferred to add the materials to the melt substantially simultaneously. While the silicon and zirconium addition is preferably made by simultaneous addition of the elements, the addition might also be made separately as aforementioned. The molten magnesium is treated with the materials, for example, by adding to the melt the zirconium material and silicon material separately or together.

The zirconium material used in the present invention may include an elemental Zr in the form of sponge or turnings, or an elemental compact or turnings of zirconium and another metal such as magnesium; a zirconium halide; a zirconium oxide or oxyhalide, or mixtures thereof.

Preferably, an elemental compact of zirconium and magnesium is used in the process of the present invention. The elemental compact is a Zr and Mg metallic product produced as a by-product in conventional processes for producing elemental zirconium metal. The elemental compact (by-product) is commercially available from companies, such as Teledyne Wah Chang/Albany of Albany, Ore., marketing the by-product for the production of zirconium containing magnesium alloys. In the present invention, an elemental compact containing from about 60 wt. % or more zirconium and about 25% or more magnesium is used.

The silicon material used in the present invention may include a crystalline elemental solid or a readily reducible compound including a silicon oxide, a silicon halide or mixtures thereof.

The zirconium and silicon might also be added as a zirconium-silicon intermetallic compound, including $Si_3Zr_5$ and/or $Si_4Zr_5$.

The combination of zirconium and silicon is added to the melt preferably as a mixture of an elemental compact of zirconium/magnesium and elemental silicon. It is also optional in the present invention to add a flux to the melt with the zirconium and silicon material. The flux used may be any conventional flux used for protecting the magnesium, zirconium, and/or other metals from burning when contacted with air. For example a halide flux such as one consisting principally of $MgCl_2$, $KCl$, and $CaF_2$ may be used. The flux is employed primarily to reduce the tendency of the zirconium reagent employed to burn in air as it is stirred into the molten metal. A $SF_6$-$CO_2$-air atmosphere may be used to minimize burning. In $SF_6$-$CO_2$-air protected melt operations, however, the simultaneous addition of a flux with the zirconium-silicon mixture results in a more efficient removal of iron from the melt treated.

The amount of zirconium and silicon should be sufficient to carry out a reduction of iron in the molten magnesium to a desired level. The zirconium added to the melt may vary from about 500 ppm to about 10,000 ppm Zr and preferably from about 800 to about 2400 ppm based on the weight of the magnesium to be treated. The silicon added to the melt may vary from about 100 ppm to about 2500 ppm Si and preferably from about 150 to about 600 ppm based on the weight of metal to be treated. The concentration of Zr or Si added to the melt will depend on the concentration of iron initially present in the magnesium and the preferred relative concentrations of iron, zirconium and silicon desired in the final product magnesium.

The ratio by weight of zirconium to silicon should be maintained in the range of about 2:1 to about 10:1, but, preferably, from about 3:1 to about 6:1 in order to limit the residual silicon and zirconium to low levels. For example, when the elements are added in a preferred ratio of about 4:1, incremental additions can be made until the iron content of the melt has been reduced to the desired level, without concern for exceeding the desired limit of 100 ppm maximum for zirconium and silicon in the final magnesium product. This is due to the inherently low solubility of the Zr-Si intermetallic formed.

For example, a preferred zirconium-silicon mixture consisting of 1500 ppm (0.15%) Zr and 375 ppm Si (a 4:1 Zr:Si ratio) based on the melt weight treated is used.

Heretofore, it was thought that the presence of significant silicon levels in a magnesium melt would render a zirconium addition ineffective in reducing iron present in the metal due to the preferential formation of a stable Zr-Si phase ($Si_3Zr_3$) of very low solubility. It has been unexpectedly discovered that the effectiveness of the zirconium in reducing the soluble iron in a magnesium melt is largely independent of the order in which the elements are introduced. For example, zirconium followed by silicon may be added to an iron containing melt; silicon followed by zirconium may be added to an iron containing melt; or zirconium followed by silicon may be added to an iron containing melt, and then an additional iron contamination may be added to the melt.

It is believed that a solubility equilibrium between iron, zirconium, and silicon exists. It is further theorized that the active phase is a binary zirconium-silicon compound of low solubility, possibly $Si_4Zr_5$ having a Zr/Si wt. ratio of 4:1 which limits the equilibrium solubility of zirconium and silicon to less than about 0.005 % each. (The solubility of zirconium, alone, is about 0.6% and the solubility of silicon, alone, is about 1.5 % at 700° C.) Although the solubility of the intermetallic is low, at the temperatures involved, it is believed that the soluble elemental iron in the molten magnesium is rapidly precipitated as a ternary phase of a composition which might be formulated $Si_4Zr_5Fe_x$.

In carrying out the treating process of magnesium metal with the zirconium-silicon mixture; thorough mixing must be employed in the process in order to achieve the desired phase equilibrium quickly. This may be accomplished with any of a number of agitator designs known in the art including a simple pitched blade propeller or a centrifugal pump with the in-take and discharge separated by a significant portion of the melt being treated.

The process temperature might vary from just over the melting point of magnesium (650° C.) to about 850° C. The reagent would be effective at still higher temperatures, but at higher temperatures the efficiency of iron reduction would be comprised by an increased solubility of the precipitate phase and an increased rate of iron pick-up from steel pots commonly used for processing the metal. Higher temperatures are also undesirable from the stand point that it is difficult to prevent burning of the magnesium at such elevated temperatures. The preferred temperature range is from about 680° C. to about 750° C., range normally employed for processing and refining the metal.

The process of the present invention using a zirconium-silicon mixture for treating magnesium metal provides a high purity magnesium with an iron content specified at less than about 100 ppm, preferably less than about 70 ppm and more preferably at less than about 50 ppm, while simultaneously introducing no more than 100 ppm of each zirconium or silicon. The content of other undesired elements such as the boron content of the magnesium is simultaneously set at less than about 1 ppm to as low as about 0.5 ppm maximum.

Typically, a "high purity magnesium" is required to contain about 99.95% by weight magnesium and no more than about 0.05 weight % impurities. Of the 0.05 Weight % impurities, iron should not exceed the levels specified above. In addition, the zirconium content of the magnesium should be less than about 100 ppm, preferably less than about 70 ppm and more preferably less than about 50 ppm. The silicon content in the magnesium should be less than about 100 ppm, preferably less than about 70 ppm and more preferably less than about 50 ppm. There may be other minor amounts of impurities making up the remainder of the 0.05% weight impurities, however, no individual impurity component present in the magnesium should exceed a level of greater than 100 ppm.

The method of treatment in accordance with the invention is preferred over the previous known treatment with zirconium alone because the level of residual zirconium in the magnesium melt is reduced by as much as an order of magnitude. The present method of treatment differs from that of a boron oxide/flux treatment in that it produces a low iron magnesium product (less than 70 ppm iron) without boron contamination.

A magnesium product treated with zirconium-silicon might be used, for example, as a low iron source for production of high purity aerospace alloy with controlled manganese levels; a low iron primary source for high performance anodes, i.e., low iron and little or no manganese; a low iron primary source for production of low iron, manganese free, photoengraving sheet; or if toxicological properties permit the low iron product might also be employed in the pharmaceutical industry where high purity magnesium has been proven to provide increased yields of synthetic drugs in many cases.

EXAMPLE 1

In this example, a magnesium melt was treated with zirconium and silicon sequentially as follows: In a 430 stainless steel crucible, set in a gas fired furnace, 150 pounds of standard electrolytic magnesium was melted and raised to a temperature of 760° C. The melt was sampled and found to contain 310 ppm iron, less than 5 ppm zirconium, and no detectable silicon. To this melt was added 0.32 pounds of 60:40 zirconium to magnesium metal reagent combined with 0.44 pounds (200 grams) of a conventional magnesium protective flux having an approximate composition of 55 wt. % $MgCl_2$, 40 wt. % KCl, and 5 wt. % $CaF_2$. This corresponded to a 1280 ppm addition of elemental zirconium. After stirring the melt for ten minutes and then settling the melt for ten minutes, a sample of the metal was analyzed and found to contain 53 ppm Fe, 710 ppm Zr, and an undetectable amount of silicon. Elemental silicon was then added to the melt in three equal increments of 50 ppm at the same temperature of 760° C. The total Si added was 150 ppm. After stirring the melt vigorously for 10 minutes and then allowing the melt to stand quiescent for an additional 10 minutes, a sample of the melt was analyzed and found to contain 54 ppm Fe, 110 ppm Zr and less than 5 ppm Si.

The results of Example 1 indicated that zirconium addition, alone, to the melt was adequate to reduce the iron content to near 50 ppm, however, the residual zirconium content exceeded a desired limit of about 100 ppm until the silicon addition was made.

EXAMPLE 2

In this example, a magnesium melt was treated with silicon and zirconium sequentially as follows: As in Example 1, 150 pounds of magnesium was melted and raised to a temperature of 760° C. Prior to treatment with Zr and Si, a sample of the melt was analyzed and found to contain 330 ppm Fe, less than 5 ppm Zr, and 7 ppm Si. To the melt was added 0.02 lbs (10.2 grams or 150 ppm) of elemental silicon plus 0.44 lbs(200 gram) of protective flux of Example 1. After stirring the melt for 10 minutes and then allowing the melt to stand quiescent for an additional 10 minutes, a sample of the melt was analyzed and found to contain 350 ppm Fe, less than 5 ppm Zr, and 110 ppm Si. The melt was then treated with 1280 ppm zirconium. The zirconium was added to the melt in two increments - one increment of approximately 860 ppm zirconium and another increment of approximately 420 ppm zirconium. In each increment a 60:40 ratio of zirconium to magnesium metal mixture combined with approximately 0.44 lbs (200 grams) of protective flux of Example 1 was used. After stirring for at least 10 minutes and then allowing the melt to stand an additional 10 minutes, the metal was analyzed and found to contain 66 ppm Fe, 170 ppm Zr, and 8 ppm Si, following the final zirconium addition.

The results of Example 2 indicated that the order of addition of the zirconium and silicon reagents was not critical. The addition of 150 ppm Si to the iron-containing melt had little effect on the iron content of the melt, and raised the level of silicon in the melt. After the zirconium addition in Example 2, the iron and silicon levels reduced to about the same levels obtained in Example 1.

The silicon addition in Examples 1 and 2 was less than preferred since the residual silicon was low and the residual zirconium level was higher than a desired level of about 100 ppm. However, iron levels in the melt were significantly reduced in Examples 1 and 2 and, in Example 1, the residual zirconium level was significantly lower than the initial 710 ppm.

EXAMPLE 3

In a 430 stainless steel crucible, set in a gas fired furnace, 150 pounds of standard electrolytic magnesium was melted and raised to a set temperature of 700° C.

The melt initially was analyzed and found to contain 300 ppm Fe, less than 5 ppm Zr, and 8 ppm Si. To the melt was added 0.31 pounds of a 60:40 zirconium to magnesium metal (which corresponds to about 1240 ppm Zr addition) combined with 10.2 grams of elemental silicon (150 ppm Si) and 200 grams of protective flux of Example 1. In this example the melt was treated with zirconium and silicon simultaneously. After stirring the melt for 10 minutes and then settling the melt for an additional 10 minutes, the metal was analyzed and found to contain 32 ppm Fe, 89 ppm Zr, and 11 ppm Si.

The results of Example 3 indicated that the simultaneous addition of Zr and Si was more effective in iron reduction than in the sequential additions described in Examples 1 and 2.

EXAMPLE 4

As in Example 3, 150 pounds of standard electrolytic magnesium was melted and raised to a set temperature of 700° C. The melt was analyzed and found to contain 330 ppm iron, 6 ppm Zr and less than 5 ppm Si. The melt was then treated with 0.62 lbs of a 60:40 ratio of zirconium to magnesium mixture (2480 ppm Zr) combined with approximately 0.5 lbs of protective flux of Example 1. The resulting melt was analyzed and found to contain 58 ppm Fe, 660 ppm zirconium and less than 5 ppm silicon after stirring and settling as in Example 3. The melt was then sequentially treated with 1000 ppm silicon in the following increments: 150 ppm, 150 ppm, 200 ppm, and 500 ppm all at a melt temperature of 700° C. After stirring the melt for 10 minutes and then settling the melt for 10 minutes following each addition of silicon, the final melt composition was found to contain 7 ppm Fe, 95 ppm Zr, and 160 ppm silicon.

EXAMPLE 5

In this example a magnesium melt was treated with zirconium and silicon simultaneously as follows: In a clean melting pot, 150 pounds of standard electrolytic magnesium was melted and the molten metal raised to 700° C. The melt was then treated with 0.62 lbs (2480 ppm Zr) of a 60:40 zirconium to magnesium reagent and 0.15 lbs (1000 ppm) of elemental silicon combined with 0.5 to 1.0 lbs of protective flux of Example 1. After thoroughly mixing the melt for 10 minutes, the melt was allowed to stand quiescent. Samples of the melt were then taken after 5, 10, and 20 minutes of standing quiescent and analyzed and the results are described in Table I below.

TABLE I

| TIME | MELT ANALYSIS (ppm) | | |
|---|---|---|---|
| (minutes) | Iron | Zirconium | Silicon |
| 5 | 11 | 70 | 61 |
| 10 | 10 | 69 | 61 |
| 20 | <5 | 65 | 46 |

The results of Examples 4 and 5 demonstrated the advantage of substantial simultaneous addition as compared to sequential addition of the zirconium and silicon reagents. The limited reduction for iron, zirconium and silicon with time described in Table I in Example 5 showed that the separation of an iron-zirconium-silicon precipitate phase was substantially complete about 5 minutes after completion of the reagent addition.

EXAMPLE 6

To the melt resulting from the treatment in Example 3 was added 50 pounds of magnesium containing 330 ppm iron. The anticipated iron content of the combined metal, according to a weighted average, would be predicted to be about 106 ppm [(32x150 +330x50)/200 =106]. Once the set temperature of 700° C. was established, the melt was stirred for 5 minutes and allowed to stand quiescent for an additional 10 minutes. The melt was then analyzed and found to contain 58 ppm Fe, 89 ppm Zr and 5 ppm Si. This example shows the unexpected continued activity of a combined zirconium-silicon phase when a magnesium high in iron is added to a treated magnesium melt, low in soluble iron and zirconium content.

EXAMPLE 7

A 150 pound melt of standard electrolytic magnesium containing 330 ppm iron was treated with 1600 ppm zirconium and 300 ppm silicon at 760° C. The resulting metal was analyzed and found to contain 46 ppm Fe, 100 ppm zirconium, and 13 ppm silicon. To the treated molten metal was added 100 lbs of additional magnesium metal (as ingots) containing 330 ppm iron. Once the charged magnesium ingot was molten, the melt was stirred. When the temperature of the melt was re-established at 760° C., mixing was stopped and after the melt was allowed to settle for 8 minutes a sample of the metal was analyzed and found to contain 44 ppm Fe, 42 ppm Zr, and 4 ppm silicon. Based on the weighted iron content of the treated magnesium metal and the untreated magnesium metal added to the melt, the final melt should have contained about 160 ppm iron [(46x150 +330x100)/250 =160]. This example shows that the precipitated zirconium-silicon phase unexpectedly continues its iron reduction activity when magnesium containing an iron impurity is combined with a treated magnesium melt.

EXAMPLE 8

The equilibrium solubilities of each of the elements - iron, zirconium, and silicon - with the precipitated phase is not highly temperature dependent, consequently the process is only mildly temperature sensitive as determined in this Example 8. In Example 2, following each zirconium addition, samples were taken at each of the following three melt temperatures: 760° C. at which all additions were made; at 720° C.; and at about 680° C. At each temperature and before the sample was taken, the melt was stirred for at least 10 minutes after equilibrating at the desired temperature and then allowed to stand quiescent for an additional 10 minutes in order to let the suspended precipitates settle. At both the 860 ppm zirconium level and at the 1280 ppm level, the variations with temperature in the analyzed contents of iron, zirconium and silicon were small as indicated by the tabulated results described Tables II and III.

TABLE II

| 150 ppm Si plus 860 ppm Zr | | | |
|---|---|---|---|
| TEMPERATURE | MELT ANALYSIS (ppm) | | |
| (°C.) | Iron | Zirconium | Silicon |
| 760 | 180 | 27 | 56 |
| 718 | 150 | 18 | 35 |
| 682 | 140 | 23 | 43 |

TABLE III

| 150 ppm Si plus 1280 ppm Zr | | | |
|---|---|---|---|
| TEMPERATURE | MELT ANALYSIS (ppm) | | |
| (°C.) | Iron | Zirconium | Silicon |
| 760 | 66 | 170 | 8 |
| 719 | 51 | 150 | 9 |
| 685 | 47 | 150 | 11 |

EXAMPLE 9

In this example, the process capabilities of the present treatment method were evaluated on a large batch scale to determine the consistency to which the metal could be processed in sequential batches through two 3000 lb pots and then cast into 450 lb ingot molds. In addition, in this example, a magnesium melt was treated with zirconium and silicon simultaneously as follows: Two 3000 lb capacity 430 stainless steel crucibles set in electrically heated furnaces were employed to evaluate the capabilities of the present treatment method on a large batch scale. Crucible #1 was used for melting and treating and crucible #2 was used as a holding and casting pot from which the treated metal was transferred to 450 lb capacity molds. Each batch consisted of approximately 2000 lbs of metal combined with a 500 lb heel from the preceding melt. In batch #1, 2500 lbs of standard electrolytic metal was charged to crucible #1, melted and then raised to a set temperature of approximately 700° C. A centrifugal pump fitted with a short dip-leg on the intake and a ¼ inch mesh basket on the outlet was then placed in the pot such that the dip-leg rested near the very bottom of the pot and the base of the basket on the discharge was positioned 6 to 12 inches below the surface. Zirconium-magnesium metal (6.25 lbs or 1500 ppm Zr), and silicon (1.25 lbs or 500 ppm) were then added, in combination with protective flux of Example 1, through the basket into the pot. After about 10 minutes of pump operation, the basket was found to be free of residual reagent and the mixing was then stopped. The melt was sampled after 10 minutes to an hours of settling. About 2000 lbs of the melt was then transferred by pump to crucible #2 which initially contained a residual heel of approximately 400 lbs of metal with an iron analysis of 350 ppm. Over a three-day period, three additional batches of metal were then sequentially melted and treated in crucible #1 and transferred to crucible #2 where the metal was held at approximately 700° C. from less than 2 minutes to 19 hours before casting into the 450 lb molds. Two analytical samples were pulled from each of the four molds cast from each batch to determine the variability in composition of the melt. Analytical results for the four batches are summarized in Tables IV and V below. Table IV describes the results obtained immediately after treating and Table V summarizes the results obtained on the samples pulled from the each mold at the point of initial and complete filling.

TABLE IV

| | NOMINAL ADDITION | | MELT ANALYSIS, ppm | | |
|---|---|---|---|---|---|
| BATCH | Zr, ppm | Si, ppm | Fe | Zr | Si |
| 1 | 1500 | 500 | 50 | <1 | 226 |
| 2 | 1500 | 250 | 29 | 30 | 40 |
| 3 | 1500 | 200 | 25 | 50 | 60 |
| 4 | 1500 | 200 | 31 | 36 | 25 |

TABLE V

| | HOLD TIME | | INGOT ANALYSIS (Average and Standard Deviation), ppm | | |
|---|---|---|---|---|---|
| BATCH | Pot #1 | Pot #2 | FE | Zr | Si |
| 1 | 3 hr | 19 hr | *119 ± 3 | 15 ± 19 | 210 ± 30 |
| 2 | 14 hr | 7 hr | 48 ± 4 | 17 ± 2 | 54 ± 20 |
| 3 | 4 hr | 18 hr | 44 ± 2 | 23 ± 3 | 26 ± 4 |
| 4 | 4 hr | <2 min | 35 ± 2 | 50 ± 16 | 15 ± 3 |

*Iron content high due to heel of untreated magnesium initially present in pot #2 (400-500 lbs at 350 ppm Fe).

EXAMPLE 10

A 3000 pound capacity 430 stainless steel crucible in an electrically heated furnace was charged with 2500 pounds of standard electrolytic magnesium and the melt temperature raised to 700° C. A centrifugal pump fitted with a short dip-leg on the intake and a ¼ inch mesh basket on the outlet was then placed in the pot such that the dip-leg rested near the very bottom of the pot and the base of the basket on the discharge was positioned 6-12 inches below the surface. Zirconium and silicon were added to the magnesium melt. Table VI, below, summarizes the additions made in three separate runs at three different ratios by weight of zirconium to silicon. The reagents used were 60/40 zirconium-magnesium metal and elemental silicon. The melt was sampled prior to the first addition and after each of six simultaneous zirconium/silicon additions. In each case, the melt was thoroughly mixed for ten minutes via the centrifugal pump and then allowed to settle for 10-15 minutes before sampling.

Figure 2:
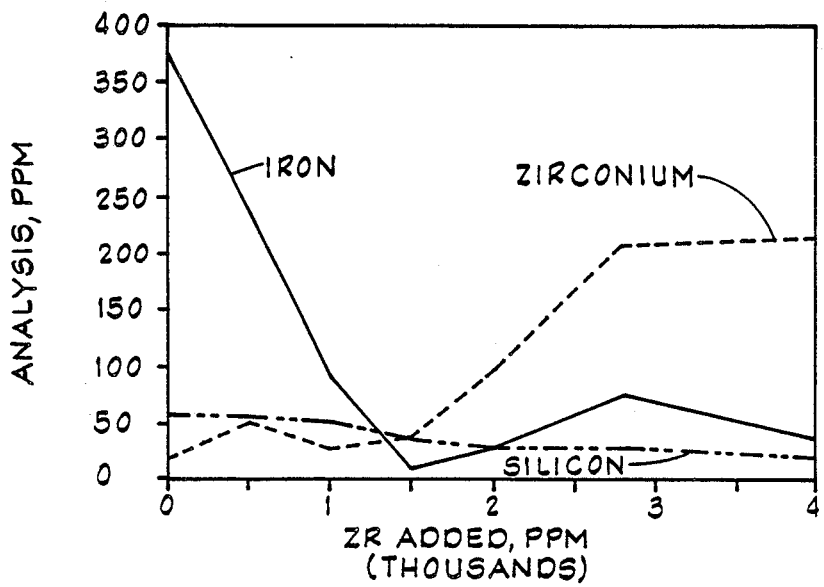
FIG. 2 is a graphical illustration of the content of iron, zirconium and silicon in magnesium melt when sequentially treated with increasing amounts of a 5.5:1 ratio of Zr/Si reagent.
Figure 3:
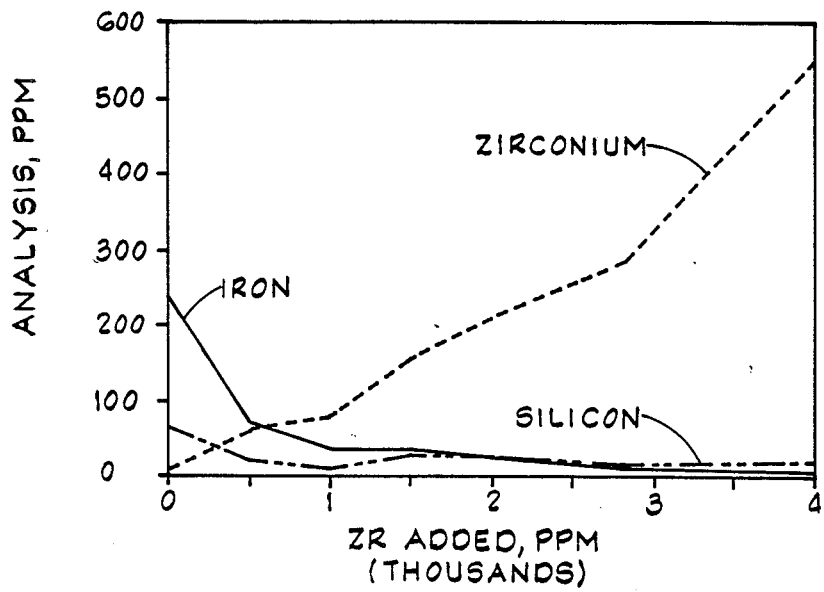
FIG. 3 is a graphical illustration of the content of iron, zirconium and silicon in magnesium melt when sequentially treated with increasing amounts of a 10:1 ratio of Zr/Si reagent.

The analytical results for the three runs described in Table VI are substantially described in FIGS. 1, 2, and 3. This example domonstrated that when zirconium and silicon were simultaneously added in a 4:1 ratio, additions beyond 1500 ppm zirconium resulted in residual zirconium and silicon levels that were substantially constant at 20-30 ppm and 55-65 ppm, respectively, whereas at higher zirconium to silicon ratios (5.5:1 and 10:1), the zirconium level continuously increased.

TABLE VI

ZIRCONIUM/SILICON CONCENTRATIONS (PPM) ADDED AT 4:1, 5.5:1 AND 10:1 RATIOS

| Addition # | Run I 4:1 (ppm) | Run II 5.5:1 (ppm) | Run III 10:1 (ppm) |
|---|---|---|---|
| 0 | — | — | — |
| 1 | 500/125 | 500/91 | 500/50 |
| 2 | 1000/250 | 1000/182 | 1000/100 |
| 3 | 1500/375 | 1500/272 | 1500/150 |
| 4 | 2000/500 | 2000/363 | 2000/200 |
| 5 | 2800/700 | 2800/509 | 2800/280 |
| 6 | 4000/1000 | 4000/727 | 4000/400 |

Figure 4:
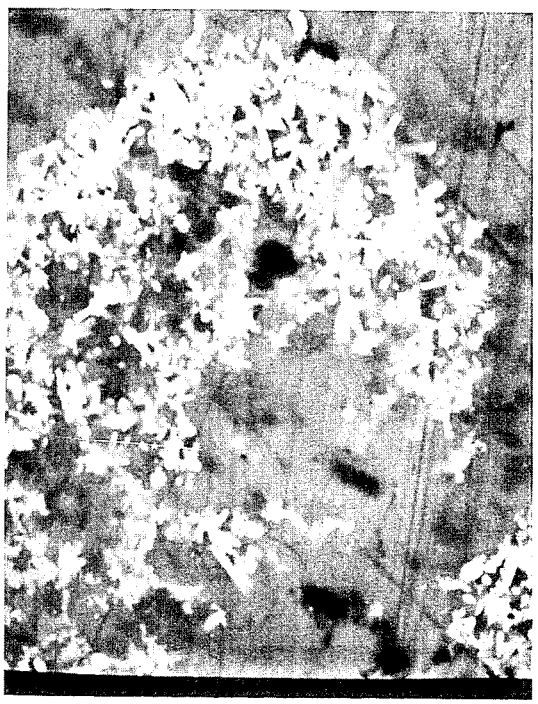
FIG. 4 is a scanning electron microscope (SEM) micrograph at 800X magnification showing a magnesium sludge containing a precipitate in residual magnesium metal.
Figure 5:
FIG. 5 is a photograph of an energy dispersive x-ray (EDX) dot map showing zirconium distribution in FIG. 4.
Figure 6:
FIG. 6 is a photograph of an energy dispersive x-ray (EDX) dot map showing silicon distribution in FIG. 4.
Figure 7:
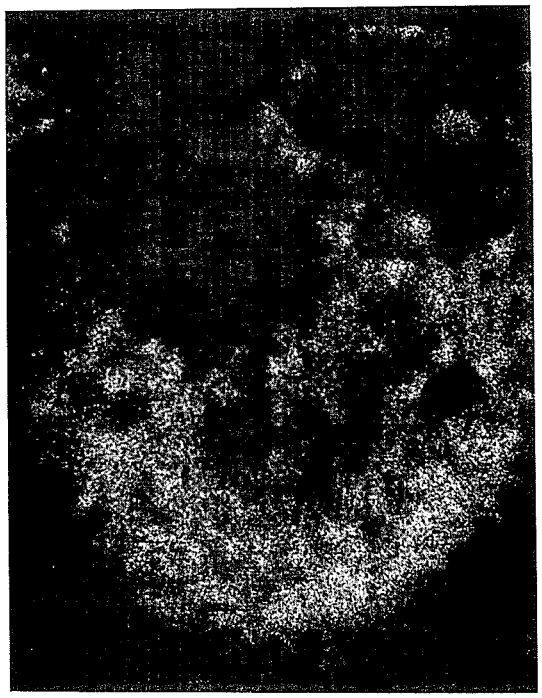
FIG. 7 is a photograph of an energy dispersive x-ray (EDX) dot map showing iron distribution in FIG. 4.

The SEM micrograph shown in FIG. 4 and the EDX photographs shown in FIGS. 5-7 were generated from the data collected in Run II (FIG. 2) described in Table VI. The FIGS. 4-7 support the theory that a single phase containing all the three elements of zirconium, silicon and iron exist in the magnesium sludge shown in FIG. 4 which is believed to be a mixture of Zr/Si reagent and Zr/Si/Fe product.

What is claimed is:

1. A process for producing magnesium low in metallic contaminants comprising:
    (a) forming a binary intermetallic phase by contacting a zirconium material and silicon material at a ratio sufficient to control the mutual solubilities of zirconium and silicon in a magnesium melt;
(b) contacting a magnesium melt containing iron contamination with the binary intermetallic phase;
(c) reacting said binary intermetallic phase with the iron in the melt to form a ternary intermetallic precipitate consisting essentially of zirconium, silicon and iron, whereby the iron contamination in the magnesium melt solution phase is reduced without simultaneously introducing significant levels of soluble zirconium and silicon; and
(d) separating the precipitate from the magnesium melt to provide a high purity magnesium.

2. The process of claim 1 wherein the iron contamination in the magnesium is reduced to less than about 100 ppm.

3. The process of claim 1 wherein the iron contamination in the magnesium is reduced to less than about 70 ppm.

4. The process of claim 1 wherein the iron contamination in the magnesium is reduced to less than about 50 ppm.

5. The process of claim 1 wherein residual zirconium contamination in the magnesium is less than about 100 ppm.

6. The process of claim 1 wherein residual zirconium contamination in the magnesium is less than about 70 ppm.

7. The process of claim 1 wherein residual zirconium contamination in the magnesium is less than about 50 ppm.

8. The process of claim 1 wherein residual silicon contamination in the magnesium is less than about 100 ppm.

9. The process of claim 1 wherein residual silicon contamination in the magnesium is less than about 70 ppm.

10. The process of claim 1 wherein residual silicon contamination in the magnesium is less than about 50 ppm.

11. The process of claim 1 wherein the melt is at a temperature of about 650° C. to about 850° C.

12. The process of claim 11 wherein the melt is at a temperature of about 680° C. to about 750° C.

13. The process of claim 1 wherein the zirconium material is elemental zirconium.

14. The process of claim 1 wherein the zirconium material is a zirconium halide.

15. The process of claim 1 wherein the zirconium material is a zirconium oxide.

16. The process of claim 1 wherein the zirconium material is a zirconium oxyhalide.

17. The process of claim 1 wherein the zirconium material is a zirconium and magnesium metal mixture.

18. The process of claim 17 wherein the mixture is from about 60 to about 75 weight percent zirconium and from about 25 to about 40 weight percent magnesium.

19. The process of claim 1 wherein the silicon material is elemental silicon.

20. The process of claim 1 wherein the silicon material is a silicon oxide.

21. The process of claim 1 wherein the silicon material is a silicon halide.

22. The process of claim 1 wherein the mixture is a zirconium-silicon intermetallic.

23. The process of claim 1 wherein the silicon material is $Si_3Zr_5$.

24. The process of claim 1 wherein the silicon material is $Si_4Zr_5$.

25. The process of claim 1 wherein the zirconium material and silicon material are added substantially simultaneously.

26. The process of claim 1 wherein the amount of zirconium added is from about 200 to about 5000 ppm based on weight of metal to be treated.

27. The process of claim 1 wherein the zirconium added is from about 800 to about 2400 ppm based on weight of metal to be treated.

28. The process of claim 1 wherein the amount of silicon added is from about 50 to about 2000 ppm based on weight of metal to be treated.

29. The process of claim 1 wherein the silicon added is from about 150 to about 600 ppm based on weight of metal to be treated.

30. The process of claim 1 wherein the ratio of Zr:Si is in the range of about 1:1 to about 10:1.

31. The process of claim 1 wherein the ratio of Zr:Si is in the range of about 3:1 to about 6:1.

32. The process of claim 1 including contacting the melt with a halide flux.

33. The process of claim 32 wherein the melt is contacted with a combination of a zirconium material and a silicon material substantially simultaneously with a halide flux.

34. The process of claim 33 wherein the halide flux includes a mixture of $MgCl_2$, KCl and $CaF_2$.

* * * * *

UNITED STATES PATENT AND TRADEMARK OFFICE
CERTIFICATE OF CORRECTION

PATENT NO. : 4,891,065
DATED : January 2, 1990
INVENTOR(S) : William C. Green, James E. Hillis It is certified that error appears in the above-identified patent and that said Letters Patent is hereby corrected as shown below:

Column 2, line 13, correct "$HCl + H_3BO_3$ or $B_2O_3.xH_2O$" to read
-- $HCl + H_3BO_3$, or $B_2O_3 \cdot xH_2O$ --

Column 4, line 38, correct "metal" to read -- melt --

Column 5, line 14, correct "750°C., range" to read -- 750°C., a range --

Column 5, line 29, correct "Weight" to read -- weight --

Column 6, line 32, correct "(200 gram)" to read --(200 grams) --

Column 10, line 36, correct "domonstrated" to read -- demonstrated --

Signed and Sealed this

Fourteenth Day of May, 1991

*Attest:*

HARRY F. MANBECK, JR.

*Attesting Officer*  *Commissioner of Patents and Trademarks*